United States Patent
Khan et al.

(12) 
(10) Patent No.: US 6,297,933 B1
(45) Date of Patent: Oct. 2, 2001

(54) DISK DRIVE SUSPENSION WITH ENCAPSULATED DAMPING MATERIAL

(75) Inventors: Amanullah Khan; Warren Coon, both of Temecula, CA (US)

(73) Assignee: Magnecomp Corporation, Temecula, CA (US)

( * ) Notice: Subject to any disclaimer, the term of this patent is extended or adjusted under 35 U.S.C. 154(b) by 0 days.

(21) Appl. No.: 09/802,511

(22) Filed: Mar. 8, 2001

Related U.S. Application Data

(63) Continuation of application No. 09/321,063, filed on May 27, 1999, now abandoned.
(60) Provisional application No. 60/130,921, filed on Apr. 23, 1999.

(51) Int. Cl.[7] ............................... G11B 5/48; G11B 21/16
(52) U.S. Cl. ............................................ 360/244.2
(58) Field of Search .................................. 360/244.2, 244, 360/244.3, 244.8, 244.9, 240

(56) References Cited

U.S. PATENT DOCUMENTS

| | | | |
|---|---|---|---|
| 4,819,094 | * | 4/1989 | Oberg ................................. 360/245.9 |
| 5,187,625 | * | 2/1993 | Blaeser et al. ..................... 360/244.3 |
| 5,771,135 | * | 6/1998 | Ruiz et al. ......................... 360/244.3 |
| 5,825,590 | * | 10/1998 | Ohwe ................................. 360/244.8 |
| 5,936,808 | * | 8/1999 | Huang et al. ..................... 360/265.9 |
| 5,949,617 | * | 9/1999 | Zhu ................................... 360/244.8 |
| 6,212,043 | * | 4/2001 | Nakamura et al. ............... 360/244.3 |

FOREIGN PATENT DOCUMENTS 1-248372 A * 10/1989 (JP).
3-278382 A * 12/1991 (JP).

* cited by examiner

Primary Examiner—Robert S. Tupper
Assistant Examiner—Julie Anne Watko
(74) Attorney, Agent, or Firm—Louis J. Bachand

(57) ABSTRACT

A disk drive suspension load beam has a damping structure attached in a load beam recess sized and shaped to limit exposure of organic damping material to the ambient atmosphere and placed to guide positioning of the damping structure.

11 Claims, 2 Drawing Sheets

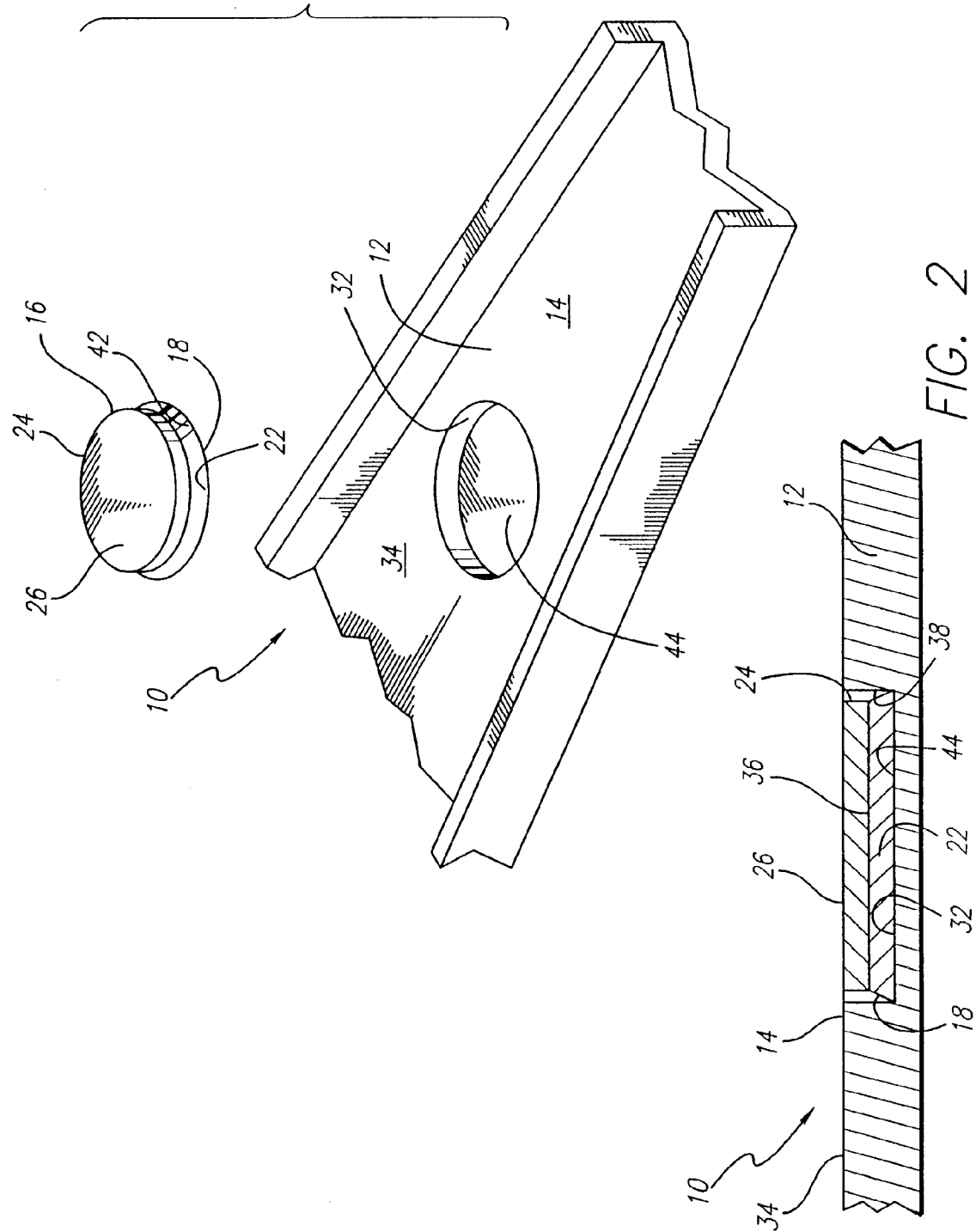

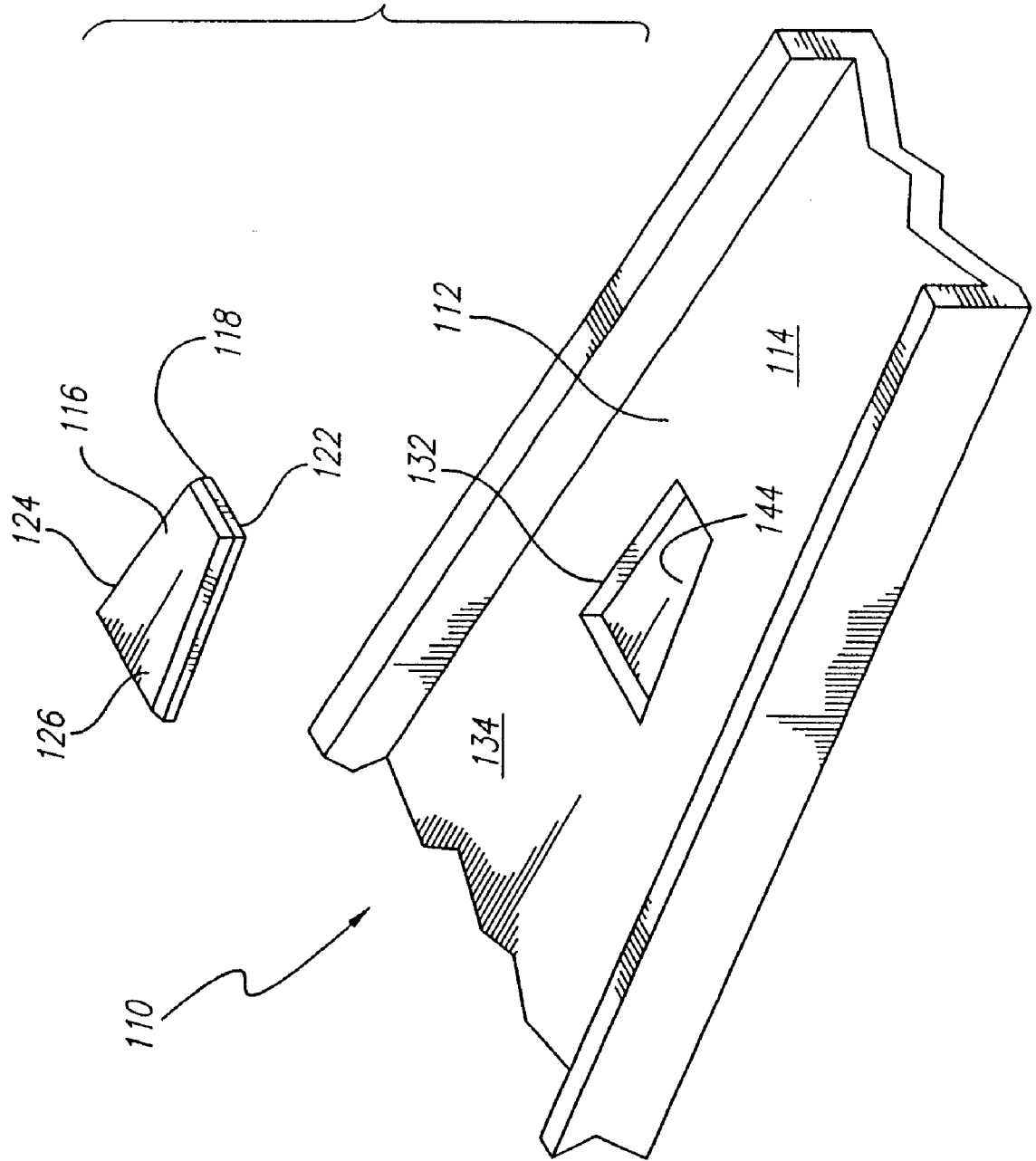

DISK DRIVE SUSPENSION WITH ENCAPSULATED DAMPING MATERIAL

REFERENCE TO RELATED APPLICATIONS

This application is a continuation of my application Ser. No. 09/321,063 filed May 27, 1999, now abandoned which application claims the benefit of U.S. Provisional Application 60/130,921 filed Apr. 23, 1999.

BACKGROUND OF THE INVENTION

1. Field of the Invention

This invention relates to disk drive suspensions, and, more particularly to improvements in the use of damping material on disk drive suspension load beams to avoid environmental degradation from outgassing of the organic damping material, or from moisture absorption and contaminant attraction by the damping material.

2. Related Art

Damping material comprises various organic, visco-elastic compositions, generally polymeric in nature, that have the property of absorbing and dissipating vibrational energy and thus serve to limit increases in amplitude of vibrations experienced by disk drive suspensions. Damping materials have been placed on suspension load beams for some years, usually as a multilayer structure of the damping material, a metal backing and optionally adhesive layers to maintain the damping material in place.

SUMMARY OF THE INVENTION

Problems with use of damping materials include difficulty of accurate placement on the load beam through operator error and the need for fixturing, and environmental degradation. Environmental degradation includes outgassing from the damping material composition that may degrade adjacent components of the suspension or disk drive, and the absorption of moisture by or the attraction of ambient atmospheric contaminants to the damping materials through their substantial exposure to ambient atmosphere.

It is an object of the present invention to limit environmental degradation associated with the use of damping materials in disk drive suspensions. It is a further object to provide for the rapid and accurate placement of damping materials on load beams. Yet another object is the provision of a recess in the load beam that accurately places the damping material and also in cooperation with a metal layer of the damping structure closes access of the ambient atmosphere to the damping material and vice-versa, thus limiting environmental degradation from and to the damping material.

These and other objects of the invention to become apparent hereinafter are realized in a disk drive suspension comprising a load beam having a distal rigid portion and a damping structure comprising a visco-elastic damping material layer and a metal layer attached to the load beam distal rigid portion in load beam vibration amplitude damping relation, the load beam distal rigid portion having a preformed recess sized and shaped to locate the damping structure on the load beam distal rigid portion and receive and encapsulate within the recess at least the damping material layer.

In this and like embodiments, typically, the damping material is organic and tends to environmental degradation when exposed to the ambient atmosphere by outgassing and attracting moisture and other environmental contaminants, and the damping material is sandwiched in the recess between the load beam distal rigid portion and the metal layer in ambient atmosphere exposure limiting relation, the damping structure is circular in cross-section, the recess being circular in cross-section and close-fitting about the damping structure, the damping structure is polygonal in cross-section, the recess being closely congruent about the damping structure, the recess is etched into a proximate area of the load beam distal rigid portion, and the damping structure has a predetermined height, the recess having a depth sufficient to fully receive the damping structure damping material layer first and metal layer second, the metal layer and the load beam portion surrounding the recess acting together to limit exposure to the ambient atmosphere of the damping material.

In a preferred embodiment, the invention provides a disk drive suspension comprising a spring metal load beam having a distal rigid portion adapted to carry a slider and a damping structure comprising in stacked relation a first layer comprising an organic, visco-elastic damping material tending to environmental degradation when exposed to ambient atmosphere by outgassing and attracting moisture and other environmental contaminants and a second overlayer comprising a metal layer covering the damping material first layer, the damping structure being attached to the load beam distal rigid portion in load beam vibration amplitude damping relation, the load beam distal rigid portion having a preformed recess positioned to locate the damping structure on the load beam distal rigid portion and sized and shaped to receive fully the damping material layer first and the metal layer second within the recess, the metal layer and the load beam portion surrounding the recess fitting closely together to limit exposure to the ambient environment of the damping material layer.

In this and like embodiments, typically, the damping structure is circular in cross-section, the recess being circular in cross-section and close-fitting about the damping structure, or the damping structure is polygonal in cross-section, the recess being closely congruent about the damping structure, and the recess is etched into a proximate area of the load beam distal rigid portion.

In a particularly preferred embodiment, the invention provides a disk drive suspension comprising a spring metal load beam having a distal rigid portion adapted to carry a slider and a damping structure of predetermined height and comprising in stacked relation a first cylindrical layer comprising an organic, visco-elastic damping material tending to environmental degradation when exposed to ambient atmosphere by outgassing and attracting moisture and other environmental contaminants and equal to from 30 to 70% of the damping structure predetermined height and a second cylindrical layer of substantially the same diameter as the first layer, the second layer diameter comprising a metal layer equal to from 70 to 30% of the damping structure predetermined height and covering the damping material first layer, the damping structure being attached to the load beam distal rigid portion in load beam vibration amplitude damping relation, the load beam distal rigid portion having a preformed cylindrical recess positioned to locate the damping structure on a proximate area of the load beam distal rigid portion and sized and shaped to receive fully the damping material layer first and the metal layer second within the recess, the metal layer and the load beam portion surrounding the recess fitting closely together to limit exposure to the ambient environment of the damping material layer.

The invention further provides a method of manufacturing a disk drive suspension having damping material attached, including forming a recess in a suspension load beam, positioning a congruent damping structure relative to the load beam with the recess, and inserting a congruent damping structure comprising a first layer of damping material and a second layer of metal into the recess to a depth such that the damping material is surrounded by the recess and covered by the metal layer within the recess.

BRIEF DESCRIPTION OF THE DRAWINGS

The invention will be further described in conjunction with the attached drawings in which:

FIG. 1 is an exploded, oblique view of a first embodiment of the invention suspension;

FIG. 2 is a view in cross-section thereof; and

FIG. 3 is a view like FIG. I of an alternative embodiment.

DETAILED DESCRIPTION

With reference now to the drawings in detail, in FIGS. 1 and 2 the invention disk drive suspension is shown at 10 and includes a spring metal load beam 12 having a distal rigid portion 14 adapted to carry a slider (not shown) and a damping structure 16. Damping structure 16 comprises in vertically stacked relation a first layer 18 comprising an organic, visco-elastic damping material 22 having a property of damping vibration, particularly damping increases in vibration amplitude. As is known, these damping materials frequently tend to cause or be subject to environmental degradation when exposed to ambient atmosphere. For example, damping materials tend to outgas as volatile organic components leave the composition over time. In addition, damping materials tend to attract environmental contaminants such as moisture and air-borne debris carried in the ambient atmosphere.

Damping structure 16 further comprises a second layer 24, an overlayer composed of a metal layer 26. Metal layer 26 is sized to cover completely the damping material first layer 18. The damping structure 16 is attached to the load beam by self-adhesion or by the use of added adhesives (not shown) in an amount and at a place, as shown, sufficient to modify the load beam 12 vibration characteristic to a predetermined useful value.

For purposes of locating the damping structure 16 accurately, without need of fixtures and in a manner less prone to operator error, the invention uses a preformed etched recess 32 in the load beam 12. Recess 32 is formed during the usual load beam forming steps that give shape to the load beam, or after, as desired. The recess 32 is placed typically in the proximate area 34 on the load beam distal portion 14. Thus placed, the recess 32 marks the locus of mounting for the damping structure 16. In the absence of the etched marker defined by the recess 32 the placement of the damping structure 16 is more problematical and prone to operator error. Additionally, the recess 32 acts as a fixture would in specifying particularly the damping material intended location.

The recess 32 serves a further important function, that of limiting the emergence of outgasses from the damping material 22. For this function the recess 32 is at least as deep as the height of the damping material 22. The metal layer 26 is sized and shaped to at least cover the upper surface 36 of the damping material layer 18. The recess sidewall 38 is sized to closely fit with the damping material layer 18 sidewall 42. The damping material 22 in the layer 18 is thus blocked from above and from the side against outgassing. The bottom wall 44 of the recess 32 blocks the lower surface 46 of the damping material layer 18. Where the recess 32 is only so deep as to admit only the damping material layer 18 before filling, the metal layer 26 can be sized to closely interfit with the recess, or can be oversized to provide a cover plate function above the recess 32 and suitably fastened to the load beam portion 14.

Preferably the recess 32 is sufficiently deep as to fully receive the entirety of the damping structure 16. In this way, the damping material layer 18 is first put into the recess and the metal layer 26 second. The damping material 22 is thus enclosed top, bottom and sides by the recess 32 and the metal layer 26 cooperatively. Outgassing is limited to an extent dependent on the closeness of fit of the damper structure 16 in the recess 32.

The recess 32 and damping structure 16 are congruent in cross-section. In FIGS. 1 and 2 the damping structure is shown to be cylindrical or have a circular cross-section. In FIG. 3, in which like parts to FIGS. 1 and 2 have like numerals plus 100, a polygonal damping structure 116 is shown for insertion is congruent recess 132. The different embodiments are matters of choice, provided a close fit of the damping structures 16, 116 in their congruent recess 32, 132 is realized.

In summary, and with reference to FIG. 1 and 2, the invention disk drive suspension 10 comprising the spring metal load beam 12 having a distal rigid portion 14 adapted to carry a slider (not shown) and a damping structure 16 of predetermined height and comprising in stacked relation a first cylindrical layer 18 comprising an organic, visco-elastic damping material 22 tending to environmental degradation when exposed to ambient atmosphere by outgassing and attracting moisture and other environmental contaminants. The first layer 18 typically will equal from 30 to 70% of the damping structure 16 predetermined height and a second cylindrical layer 24 of metal and of substantially the same diameter as the first layer will equal correspondingly from 70 to 30% of the damping structure predetermined height while covering the damping material first layer. The load beam distal rigid portion 14 has a preformed cylindrical recess 32 positioned to locate the damping structure 16 on a proximate area 34 of the load beam distal rigid portion and sized and shaped to receive fully the damping material layer first 18 and the metal layer 24 second within the recess, the metal layer and the load beam portion surrounding the recess fitting closely together to limit exposure to the ambient environment of the damping material 22.

In its method aspects, the load beam rigid portion 14 is etched to form the recess 32 of desired dimensions. A congruent damping structure 16 is positioned using the recess 32 as a locator to place the congruent damping structure relative to the load beam 12, the damping structure 16 inserted into the recess 32, damping material layer 18 first, metal layer 24 second, and to a depth such that the damping material 22 is surrounded by the recess and covered by the metal layer within the recess.

The invention thus provides to limit environmental degradation associated with the use of damping materials in disk drive suspensions and to provide for the rapid and accurate placement of damping materials on load beams, a recess in the load beam that accurately places the damping material and also in cooperation with a metal layer of the damping structure closes access of the ambient atmosphere to the damping material and vice-versa, limiting environmental degradation from and to the damping material. The foregoing objects are thus met.

We claim:

1. A disk drive suspension comprising a load beam having a distal rigid portion and a damping structure comprising a visco-elastic damping material layer and a metal layer attached to said load beam distal rigid portion in load beam vibration amplitude damping relation, said load beam distal rigid portion having a general surface plane and a preformed recess extending into said distal rigid portion from said surface plane, said recess being sized and shaped to locate said damping structure on said load beam distal rigid portion and receive at least the damping material layer within said recess and at least partially below said surface plane.

2. The disk drive suspension according to claim 1, in which said damping material is organic and tends to environmental degradation when exposed to the ambient atmosphere by outgassing and attracting contaminants, said damping material being located below said general surface plane and sandwiched in said recess between said load beam distal rigid portion and said metal layer in ambient atmosphere exposure limiting relation.

3. The disk drive suspension according to claim 1, in which said damping structure is circular in cross-section, said recess comprising a hole extending from said surface plane and circular in cross-section and close fitting about said damping structure.

4. The disk drive suspension according to claim 1, in which said damping structure is polygonal in cross-section, said recess comprising a hole closely congruent about said damping structure.

5. The disk drive suspension according to claim 1, in which said rigid portion has left and right edge rails rising from said surface plane, said recess being etched into a proximate area of said load beam distal rigid portion between its said edge rails.

6. The disk drive suspension according to claim 1, in which said damping structure has a predetermined height, said recess having a depth from said surface plane sufficient to fully receive said damping structure damping material layer first and metal layer second, said metal layer being at substantially the level of said surface plane, said metal layer and said load beam portion surrounding said recess acting together to limit exposure to the ambient atmosphere of said damping material.

7. A disk drive suspension comprising a spring metal load beam having a distal rigid portion adapted to carry a slider and a damping structure comprising in stacked relation a first layer comprising an organic, visco-elastic damping material tending to environmental degradation when exposed to ambient atmosphere by outgassing and attracting contaminants and a second overlayer comprising a metal layer covering said damping material first layer, said damping structure being disposed within a hole in said load beam distal rigid portion in load beam vibration amplitude damping relation, said load beam distal rigid portion hole being positioned to locate said damping structure on said load beam distal rigid portion and sized and shaped to receive fully said damping material layer first and said metal layer second within said hole, said metal layer and said load beam portion surrounding said recess fitting closely together to limit exposure to the ambient environment of said damping material layer.

8. The disk drive suspension according to claim 7, in which said damping structure is circular in cross-section, said hole being circular in cross-section and close fitting about said damping structure.

9. The disk drive suspension according to claim 7, in which said damping structure is polygonal in cross-section, said hole being closely congruent about said damping structure.

10. The disk drive suspension according to claim 7, in which said hole is etched into a proximate area of said load beam distal rigid portion.

11. A disk drive suspension comprising a spring metal load beam having a distal rigid portion adapted to carry a slider and a damping structure of predetermined height, said damping structure comprising in stacked relation a first cylindrical layer comprising an organic, visco-elastic damping material tending to environmental degradation when exposed to ambient atmosphere by outgassing and attracting contaminants and equal to from 30 to 70% of said damping structure predetermined height and a second cylindrical layer of substantially the same diameter as said first layer, said second layer diameter comprising a metal layer equal to from 70 to 30% of said damping structure predetermined height and covering said damping material first layer, said damping structure being attached to said load beam distal rigid portion in load beam vibration amplitude damping relation, said load beam distal rigid portion having a preformed cylindrical hole positioned to locate said damping structure on a proximate area of said load beam distal rigid portion and sized and shaped to receive fully said damping material layer first and said metal layer second within said cylindrical hole, said metal layer and said load beam portion surrounding said hole fitting closely together to limit exposure to the ambient environment of said damping material layer.

* * * * *